Figure 1:
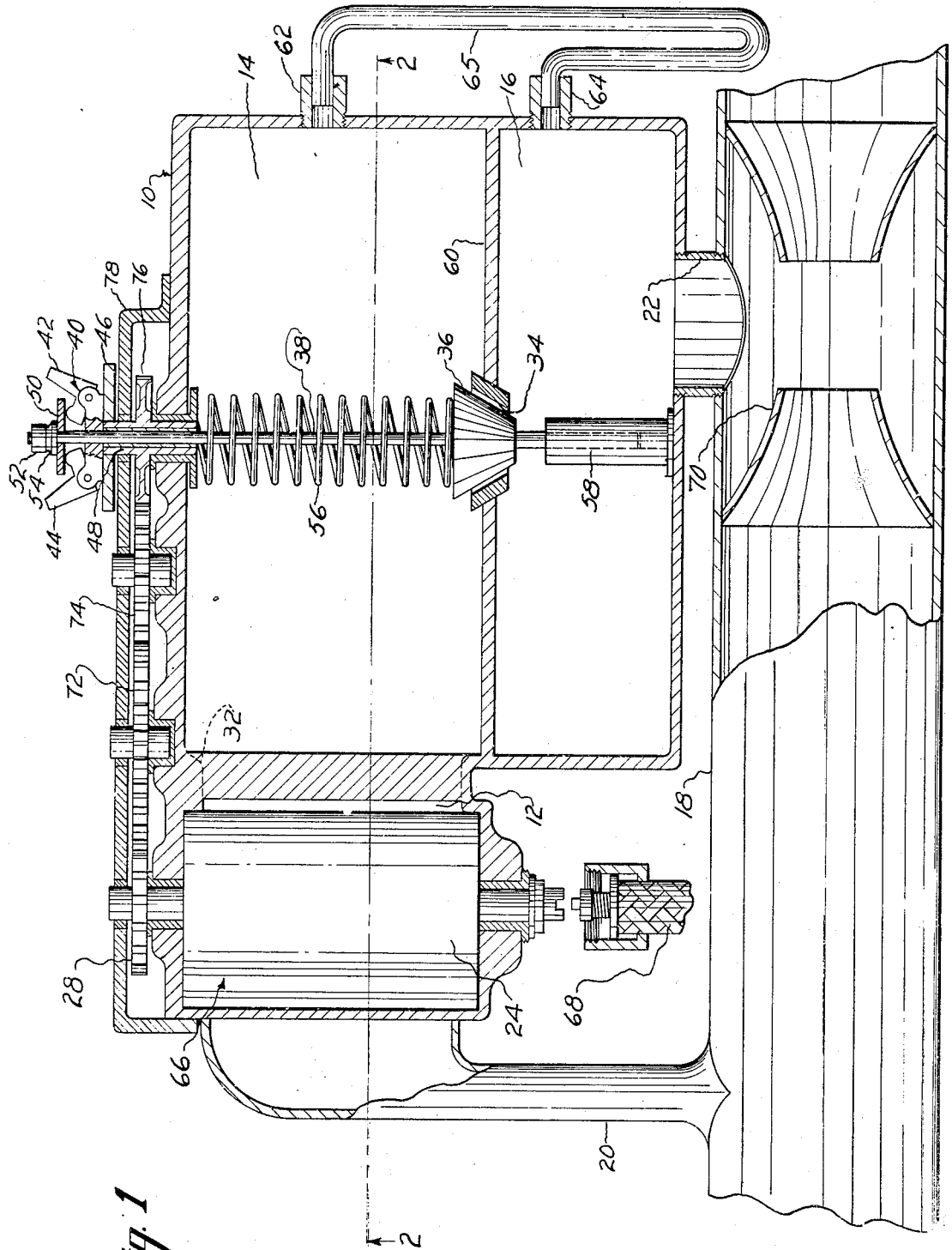

July 13, 1943.  D. S. HERSEY  2,324,391
DENSITY MEASURING DEVICE
Filed Dec. 27, 1939  2 Sheets-Sheet 1

INVENTOR
Donald S. Hersey
BY Harris G. Luther
ATTORNEY

July 13, 1943.                D. S. HERSEY                2,324,391
DENSITY MEASURING DEVICE
Filed Dec. 27, 1939                2 Sheets-Sheet 2

INVENTOR
Donald S. Hersey
BY Harris G. Luther
ATTORNEY

Patented July 13, 1943

2,324,391

UNITED STATES PATENT OFFICE 2,324,391

DENSITY MEASURING DEVICE

Donald S. Hersey, West Hartford, Conn., assignor to United Aircraft Corporation, East Hartford, Conn., a corporation of Delaware Application December 27, 1939, Serial No. 311,153

16 Claims. (Cl. 265—44)

This invention relates to improvements in density measuring devices and has for an object the provision of an improved device for continuously measuring the density of a stream or body of a fluid such as air.

A further object resides in the provision of an improved density measuring device which is capable of measuring the density of a stream or body of fluid such as air under conditions of varying temperature and pressure of the fluid.

A still further object resides in the provision of an improved density measuring device which will continuously measure the density of a stream or body of gas such as air under conditions of varying temperature and pressure of the gas and will not require correction or compensation for temperature and pressure variations.

An additional object resides in the provision of a density measuring device of the character indicated which is simple and rugged in construction, light in weight and of small size so that it may easily be carried by a vehicle such as an airplane to continuously measure the density of the intake air of the airplane engine and control the operation of the engine air or fuel control in accordance with density variations of the intake air.

Other objects and advantages will be more particularly pointed out hereinafter or will become apparent as the description proceeds.

In the accompanying drawings, in which like reference numerals are used to designate similar parts throughout, there is illustrated in somewhat schematic form a suitable mechanical arrangement for the purpose of disclosing the invention. The drawings, however, are for the purpose of illustration only and are not to be taken as limiting the invention since it will be apparent to those skilled in the art that various changes in the illustrated arrangement may be resorted to without in any way exceeding the scope of the invention.

Figure 2:
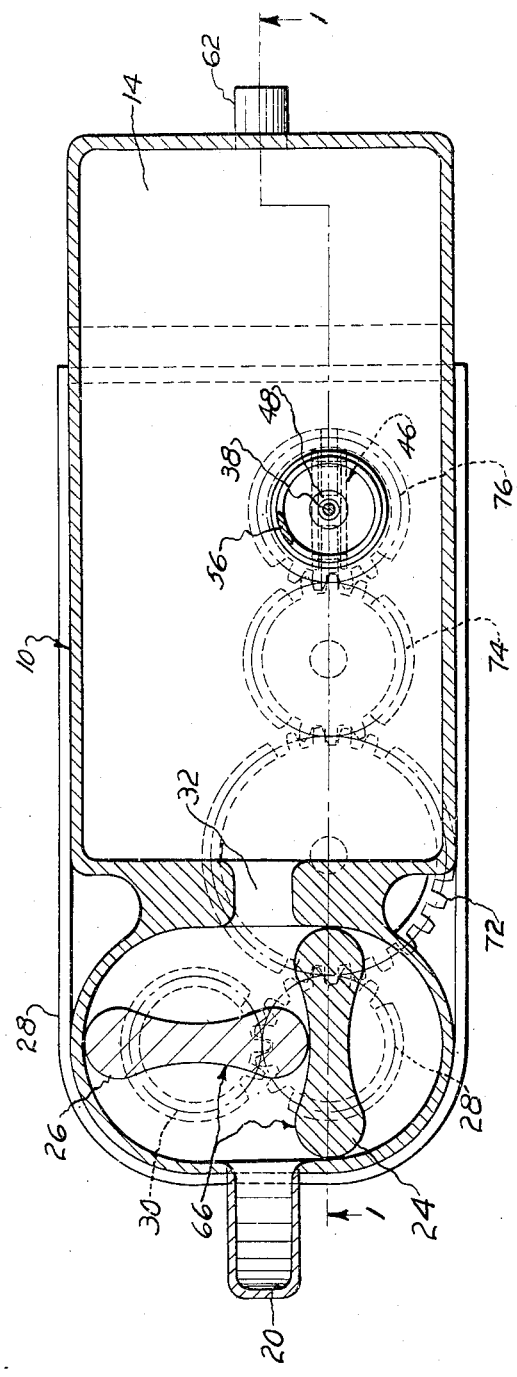

In the drawings, Fig. 1 is a sectional view of the improved density measuring apparatus taken on the line 1—1 of Fig. 2, and Fig. 2 is a sectional view taken on the line 2—2 of Fig. 1.

Referring to the drawings in detail, the numeral 10 generally indicates a hollow casing provided with three interconnected chambers 12, 14 and 16. A gas chamber or gas flow duct 18 is connected with the chamber 12 by the connection 20 and with the chamber 16 by the connection 22. The chamber 12 constitutes the casing of a constant displacement pump such as a "Roots pump" having two cooperating vanes 24 and 26 operatively connected by the gears 28 and 30. The pump chamber 12 is connected with the intermediate chamber 14 through a passage 32 which is capable of passing the maximum output of the pump without material restriction and the chamber 16 is connected with the intermediate chamber 14 through an aperture 34 the size of which is controlled by a movable plug or valve member 36. The valve member 36 is provided with a stem 38 which extends through the wall of the chamber 14 to a speed responsive device, generally indicated at 40. The speed responsive device has been illustrated as including a pair of centrifugally actuated flyballs 42 and 44 mounted on a rotatable base 46 carried upon the upper end of a rotatable hollow shaft 48 through which the stem 38 extends, and a thrust plate 50 secured to the upper end of the stem 38 by suitable means such as the nuts 52 and 54 and bearing against the bell crank portions of the flyballs 42 and 44 so that the flyballs will move the stem through the shaft 48 as they move outwardly in response to increases in the rotational speed of the shaft 48 and base 46. The valve member 36 is urged in a direction opposite to the action of the flyballs 42 and 44 by a spring 56 which is carefully selected to oppose the action of the centrifugally actuated device 40 with the correct amount of force at all times. If desired, the stem 38 may be extended beyond the member 36 and associated with a suitable guide 58 which may be mounted on the wall of the chamber 16 opposite the partition 60, to maintain the member 36 properly centered with respect to the aperture 34 in the partition. The chamber 14 is provided through one wall thereof with a suitable fluid connection 62 and the chamber 16 is provided with a similar connection 64, which connections may be operatively connected with a suitable indicating device such as a manometer, indicated at 65, or a suitable fluid servo-motor, not illustrated, for operating desired control instrumentalities. A Pitot-static tube located at the orifice throat, measuring the velocity head, can be used in a manner similar to connections 62 and 64 for operating an indicating device or servo-motor, if desired.

The pump, generally designated at 66, may be operated either by a flow of fluid through the device or from an engine by a suitable driving means such as the flexible driving connection 68. A flow of fluid sufficient to drive the pump may be created by providing in a fluid-flow channel, such as the channel 18, a restriction 70, in the form of a Venturi tube having an opening adjacent to the connection 22. With this arrangement, the fluid pressure at the connection 20 being higher than the pressure at the opening in the Venturi tube 70 opposite the end of the connection 22, a flow of fluid from the connection 20 to the connection 22 sufficient to operate the pump 66 will be maintained as long as there is sufficient velocity of fluid flow through the conduit 18.

The operation of the device is substantially as follows:

For any given constant speed, the pump 66 will pass a given volume per unit of time of fluid, such as air, into the chamber 14. The fluid pumped into the chamber 14 passes from this chamber through the orifice 34 into the chamber 16 and out of the chamber 16 through the vent connection 22. By well-known physical principles, a pressure difference between the interiors of the chambers 14 and 16 will be a natural incident of fluid flow from one chamber to the other. This pressure difference will be determined by the mass quantity of air, or other fluid, admitted to the chamber 14 by the pump 66 and the size of the air exit through the orifice 34. Since the pump has an invariable volumetric capacity for each particular operating speed, the volume of fluid admitted by the pump at a constant pump speed will be constant. The mass of the fluid admitted by the pump per unit of time at a particular constant pump speed will, however, vary in accordance with variations in the density of the fluid. If the area of the orifice 34 remains constant, the difference between the fluid pressures on opposite sides of the orifice, or the velocity head at the throat of the orifice which pressure difference and which velocity head are proportional to the mass flow of fluid through the orifice, must vary with the variations in density, which is the only true variable present. In other words the pump at a certain speed will pass a definite volume of fluid in a given time regardless of density. This entire volume of fluid must pass through the orifice 34 and to accomplish this a definite pressure difference must be established on opposite sides of the orifice which pressure difference will remain constant as long as the fluid passed by the pump remains at a constant density. If now the density of the fluid increases, the pump will continue to deliver the same volume but the pressure difference at the orifice must be increased to pass that volume of greater density fluid. The pressure difference, therefore, becomes a measure of the density of the fluid passing the pump. If the device indicating the pressure differential between the connections 62 and 64 be properly calibrated, the apparatus will continuously indicate the density of the fluid flowing through it or, if the connections 62 and 64 are connected with a fluid servo-motor, will position the servo-motor in accordance with density variations in the other fluid. From the above description, it is apparent that with a pump of a given volumetric capacity operating at a particularly constant speed, the area of the orifice 34 and the indications on the pressure differential measuring device can be so calibrated as to give the correct density reading for variations in the temperature and pressure of the gas flowing through the device. If the speed of the pump 66 be changed, however, the same orifice area would not give the same readings on the differential pressure indicating device and the area of the orifice would have to be changed to compensate for the change in pump speed. There would be an orifice area, however, for each pump speed which would give the correct density reading on the pressure differential indicating device, or which would properly position the fluid servo-motor in accordance with the indicated density. In order to render the device continuously operative means have been provided for varying the orifice area in direct accordance with the speed variations of the pump, which means includes the plug 36 and the speed responsive device 40.

A gear 72 meshes with one of the pump gears 28 or 30, for example with the gear 28, and also meshes with an idler gear 74 which in turn meshes with a gear 76 on the shaft 48 so that the device 40 is always rotated at a speed bearing a constant ratio to the speed of the pump 66. Centrifugal force acting on the flyballs 42 and 44 then adjusts the plug 36 in accordance with the speed of the pump 66 to adjust the area of the orifice 34 to pump speed and thereby maintain a constant relation between the pressure difference of the gas in the chambers 14 and 16 and the density of the gas passing through the device regardless of pump speed.

The gear train including the gears 28, 30, 72, 74 and 76 may be protected by a suitable closure or cover member 78 which may also provide one set of bearings for the gear shafts, the other set of bearings being provided in the corresponding wall of the casing 10.

The chamber 14 is made sufficiently large to absorb the pulsation from the pump 66 so that the flow of air through the orifice 34 will be substantially steady, and the chamber 16 is made sufficiently large to absorb minor variations in the flow of the air or gas through the orifice so that the pressure difference between the connections 62 and 64 will not be subject to rapid fluctuation but will vary only with variations in density of the fluid passing through the device.

While a suitable mechanical embodiment of the improved density measuring device has been hereinabove described and illustrated in the accompanying drawings for the purpose of disclosing the invention, it is to be understood that the invention is not limited to the particular embodiment so illustrated and described, but that such changes in the size, shape and arrangements of the various parts may be resorted to as come within the scope of the sub-joined claims.

Having now described the invention so that others skilled in the art may clearly understand the same, what it is desired to secure by Letters Patent is as follows:

1. In combination, a rotatable fluid measuring device having a definite volumetric capacity for each operating speed, a fluid duct connected with said measuring device, an orifice in said duct for establishing a pressure differential proportional to the fluid density, means for varying the area of said orfice in accordance with the speed of said measuring device, and a device pneumatically connected with the spaces at opposite sides of said orifice and having a part movable in accordance with variations in the pressure difference across said orifice.

2. In combination, a fluid conduit, a rotatable fluid measuring device in said conduit operated by the flow of fluid through said conduit and having a definite volumetric capacity for each operating speed, a variable area orifice in said conduit, means for varying the area of said orifice in accordance with a function of the speed of said measuring device, and a device pneumatically connected with the spaces at opposite sides of said orifice and having a part movable in accordance with variations in the pressure difference across said orifice.

3. In combination, a fluid conduit, a fluid pump in said conduit having a definite volumetric capacity for each operating speed, a variable area orifice in said conduit, means for driving said pump, means for increasing the area of said orifice in accordance with increase in the speed of said pump and mechanism for transmitting the pressure at the orifice inlet and the pressure at the orifice outlet to a pressure responsive device.

4. In combination, a fluid conduit, a fluid pump in said conduit having a definite volumetric capacity for each operating speed, a variable area orifice in said conduit, a power shaft for driving said pump, means for reducing the area of said orifice in accordance with a reduction in the speed of said pump and a device pneumatically connected with the spaces at opposite sides of said orifice and having a part movable in accordance with variations in the pressure difference across said orifice.

5. In combination, a fluid conduit, a rotatable fluid measuring device in said conduit having a definite volumetric capacity for each operating speed, a chamber in said conduit at one side of said measuring device, a variable area restricted fluid passage through the wall of said chamber for establishing a pressure differential between the interior and the exterior of said chamber proportional to the density of the fluid flowing through said conduit, and means for varying the area of said passage in accordance with the speed of said measuring device, and a device pneumatically connected with the spaces at opposite sides of said restricted passage and having a part movable in accordance with variations in the pressure difference across said passage.

6. In combination, a fluid conduit, a fluid pump in said conduit having a definite volumetric capacity for each operating speed, a variable area orifice in said conduit, means for driving said pump, means for varying the area of said orifice in accordance with the speed of said pump, and a device connected with the spaces at opposite sides of said variable area orifice operated by the pressure difference across said orifice.

7. In combination, a gas flow duct carrying gas subject to variations in density, a fluid measuring device subject to variations in operating speed pneumatically connected with said duct and passing a definite volume of gas from said duct for each operating speed, an orifice through which all gas passed by said measuring device flows, speed responsive means driven with said measuring device and operatively associated with said orifice for varying the area of said orifice in accordance with variations in the speed of said measuring device to maintain across said orifice a predetermined pressure head proportional to the density of said gas, and a device having an element movable in accordance with variations in the pressure head across said orifice pneumatically connected across said orifice and operated by said pressure head.

8. A fluid sampling and density determining device comprising, a chamber having an inlet and an outlet, a constant displacement fluid metering device at said inlet, an orifice at said outlet, means creating a flow of fluid through said chamber to drive said metering device, means for varying the area of said orifice in proportion to the speed of said metering device, and means connected across said orifice responsive to the fluid pressure differential on opposite sides of said orifice.

9. A fluid sampling and density determining device comprising, a chamber having an inlet and an outlet, a constant displacement fluid metering device at said inlet, a second chamber at said outlet, an orifice between said chambers, and means for varying the area of said orifice in accordance with the speed of said metering device, and means pneumatically connected to both said chambers and having a part movable in accordance with variations in the pressure differential across said orifice.

10. A gas sampling and density detecting device comprising, a chamber having an inlet and an outlet, a variable speed gas pump for moving gas through said chamber, power actuated means driving said pump at varying speeds, a restriction in said chamber for establishing a pressure differential in said gas, and means for maintaining a predetermined ratio between the volumetric rate of flow of gas moved by said pump through said chamber and the size of said restriction for maintaining said pressure differential proportional to the density of said gas at each of said various pump speeds, and means connected with said chamber at opposite sides of said restriction and having a part movable in accordance with variations in density of said gas as reflected in the pressure difference across said restriction.

11. In combination with a fluid measuring device which has a definite volumetric capacity for each operating speed, a conduit leading from the outlet of said measuring device, and an orifice in said conduit to establish a pressure differential indicating the mass flow of air through said orifice, means for varying the size of said orifice in accordance with the operating speed of said measuring device comprising a speed responsive device driven by said measuring device, and a tapered plug movable in said aperture by said speed responsive device, and a device pneumatically connected to the spaces at opposite sides of said orifice and having a part movable in response to variations in the pressure differential across said orifice.

12. Means for sampling and determining the density of gas flowing through a conduit comprising, an enclosed passage arranged in shunt of said conduit and connected with said conduit at spaced apart locations, a rotatable gas measuring device in said passage having a definite volumetric capacity for each operating speed, a transverse partition in said passage having an aperture therethrough, means responsive to the speed of said measuring device for varying the size of said aperture in accordance with the volumetric rate of flow of gas through said passage, and a device pneumatically connected with the spaces within said passage at opposite sides of said orifice and having a part movable in accordance with variations in the pressure differential across said orifice.

13. In combination, a rotatable fluid measuring device having a definite volumetric capacity for each operating speed, a fluid duct leading to said measuring device, a fluid duct leading from said measuring device, an orifice in one of said ducts for establishing a pressure differential proportional to the density of the fluid passing through said ducts and said measuring device, means for varying the area of said orifice in accordance with the speed of said measuring device, and a device pneumatically connected with the spaces at opposite sidees of said orifice and having a part movable in accordance with variations in the pressure difference across said orifice.

14. In combination, a rotatable fluid measuring device having a definite volumetric capacity for each operating speed, a fluid duct connected with said measuring device, an orifice in said duct for establishing a pressure differential proportional to the fluid density, means for varying the area of said orifice in accordance with the speed of said measuring device, and means pneumatically connected with the spaces at opposite sides of said orifice responsive to variations in the pressure differential across said orifice to indicate the density of the fluid flowing through said orifice.

15. A fluid sampling and density detecting device comprising, a chamber having an inlet and an outlet, a constant displacement fluid pump at said inlet, power actuated means for driving said pump, a restricted orifice in one wall of said chamber, means for varying the area of said orifice in accordance with the speed of said pump, and means pneumatically connected to the spaces at opposite sides of said orifice having a part movable in accordance with variations in the pressure difference across said orifice.

16. In combination with a fluid pump which has a definite volumetric capacity for each operating speed and means for driving said pump at various operating speeds, a conduit leading to the inlet of said pump, an orifice in said conduit to establish a pressure differential indicating the mass flow of air through said orifice, means for varying the size of said orifice in accordance with the operating speed of said pump, and a device pneumatically connected to the spaces at opposite sides of said orifice and having a part movable in response to variations in the pressure differential across said orifice.

DONALD S. HERSEY.